Nov. 17, 1936.　　　T. C. VAN DEGRIFT　　　2,060,963
VIBRATION INDICATING DEVICE
Filed Jan. 17, 1934　　　6 Sheets-Sheet 1
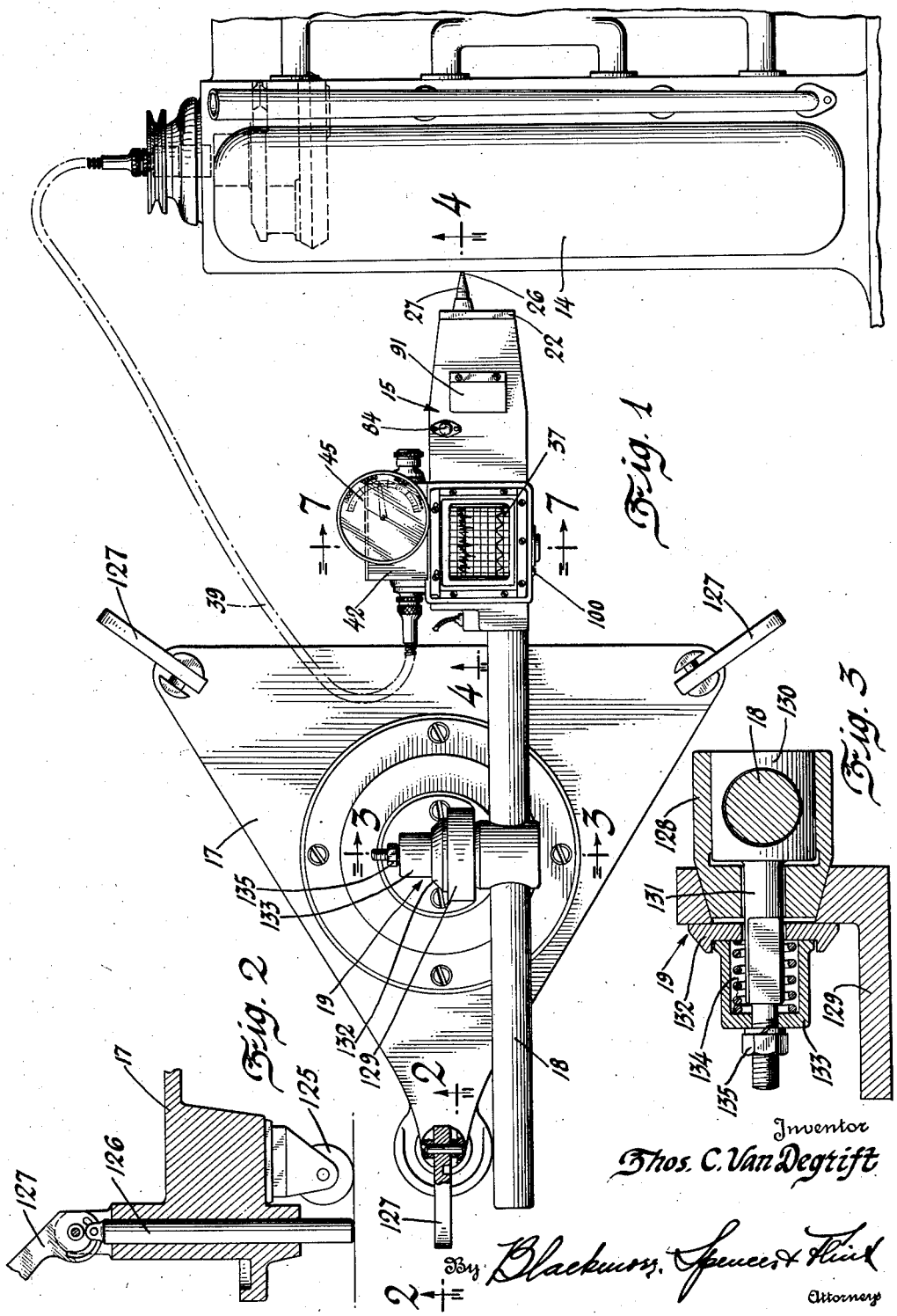

Nov. 17, 1936.   T. C. VAN DEGRIFT   2,060,963
VIBRATION INDICATING DEVICE
Filed Jan. 17, 1934        6 Sheets-Sheet 2
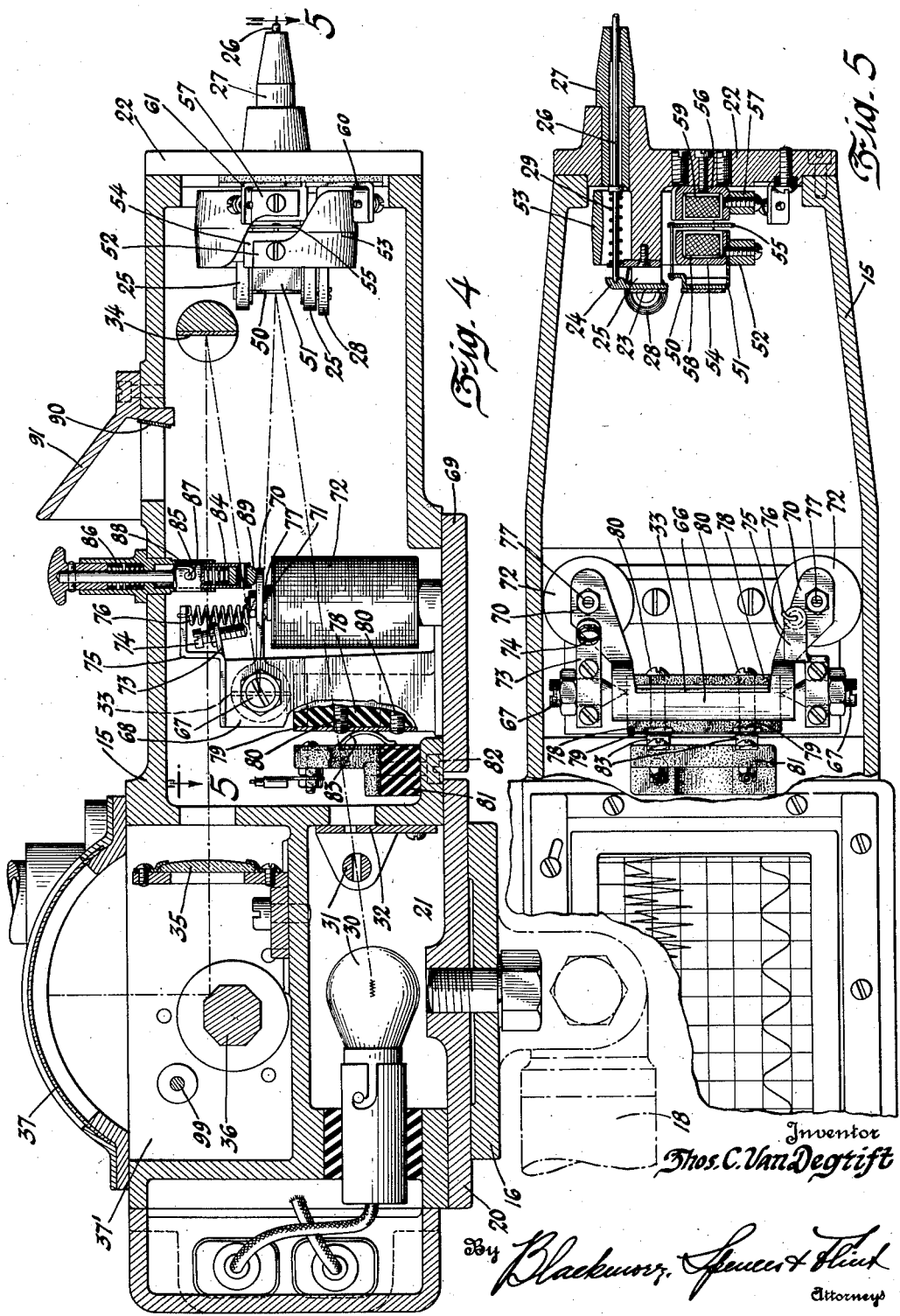
Inventor
Thos. C. Van Degrift
By Blackburn, Spencer & Flint
Attorneys Nov. 17, 1936.   T. C. VAN DEGRIFT   2,060,963
VIBRATION INDICATING DEVICE
Filed Jan. 17, 1934   6 Sheets-Sheet 3
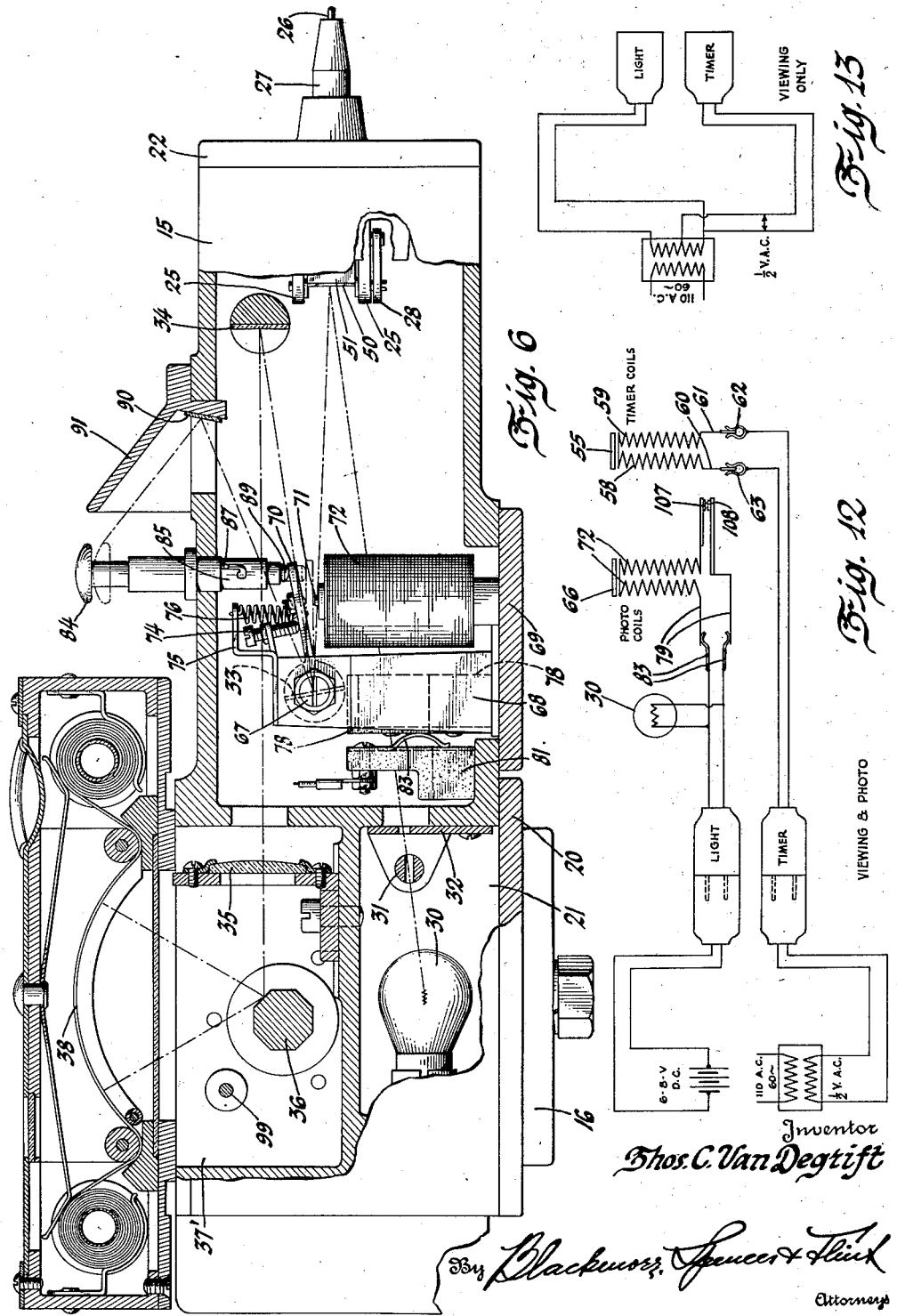
Inventor
Thos. C. Van Degrift
By Blackmore, Spencer & Flint
Attorneys Nov. 17, 1936. T. C. VAN DEGRIFT 2,060,963
VIBRATION INDICATING DEVICE
Filed Jan. 17, 1934 6 Sheets-Sheet 4

Inventor
Thos. C. Van Degrift
By Blackmore, Spencer & Flint
Attorneys

Nov. 17, 1936.   T. C. VAN DEGRIFT   2,060,963
VIBRATION INDICATING DEVICE
Filed Jan. 17, 1934   6 Sheets-Sheet 5
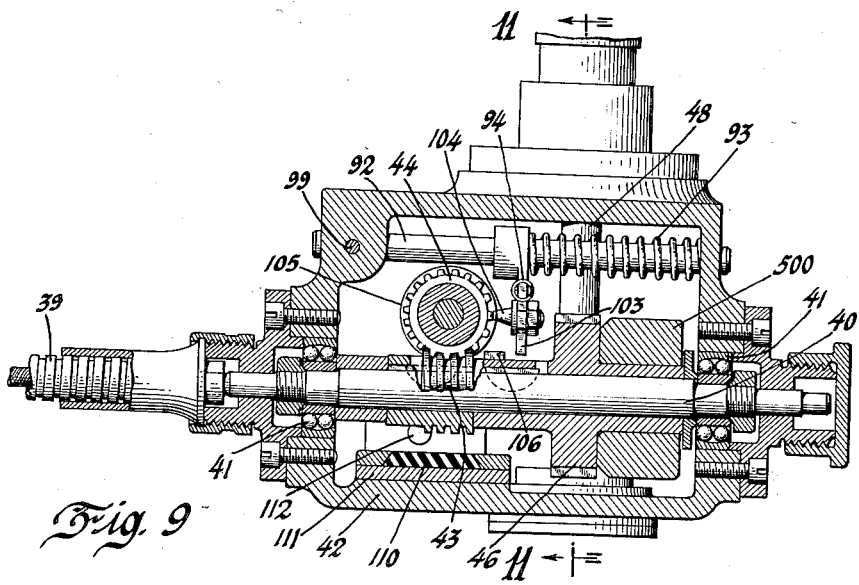
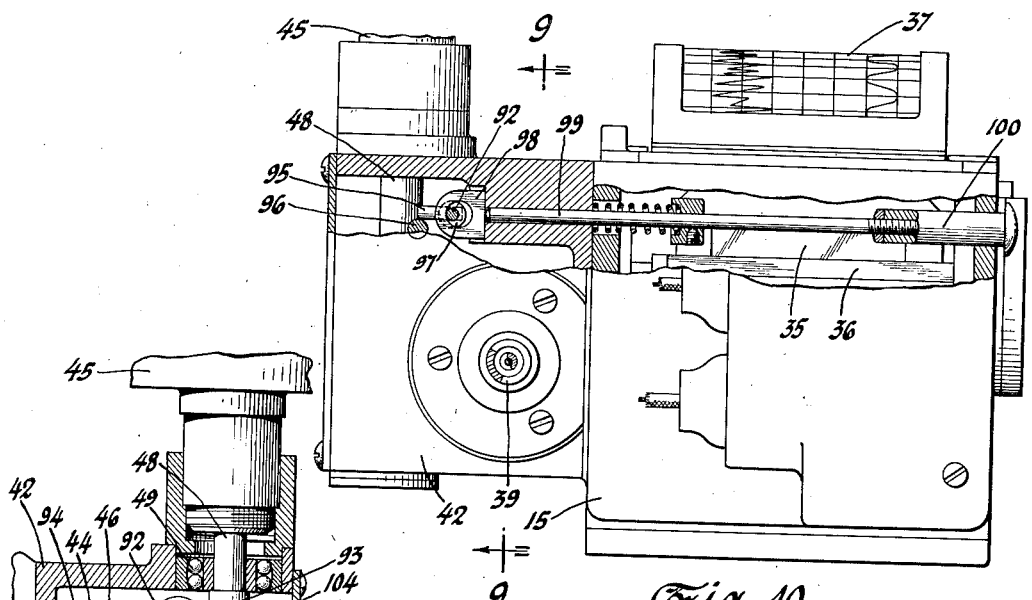
Inventor
Thos. C. Van Degrift
By Blackmore, Spencer & Flint
Attorneys Nov. 17, 1936.  T. C. VAN DEGRIFT  2,060,963
VIBRATION INDICATING DEVICE
Filed Jan. 17, 1934  6 Sheets-Sheet 6
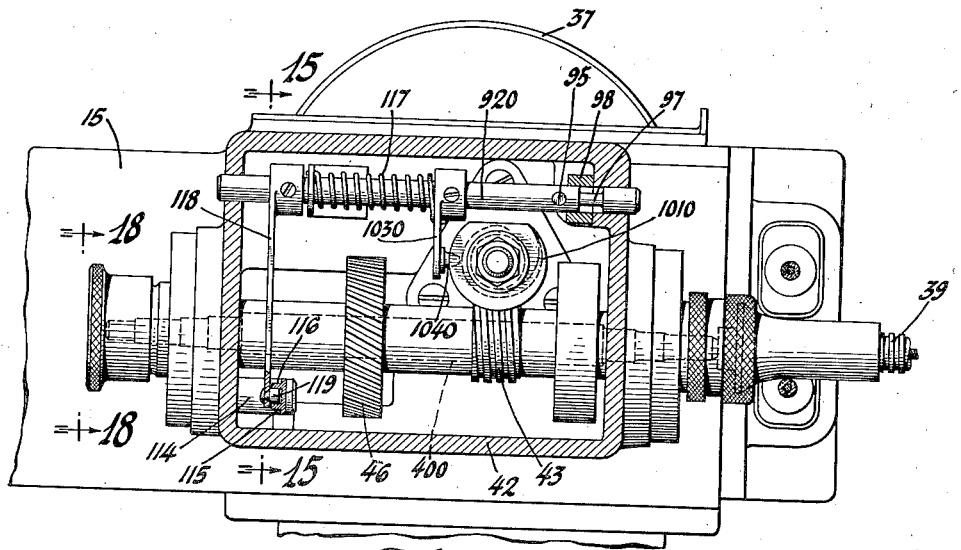
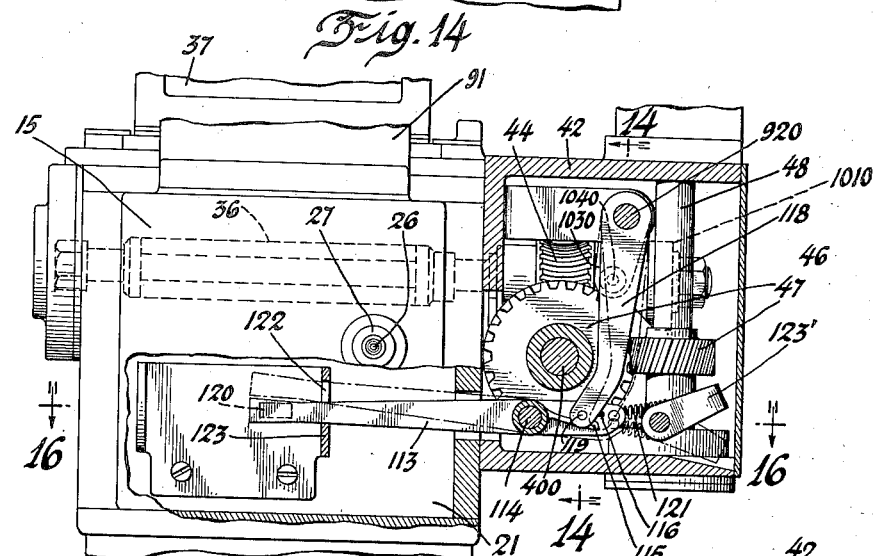
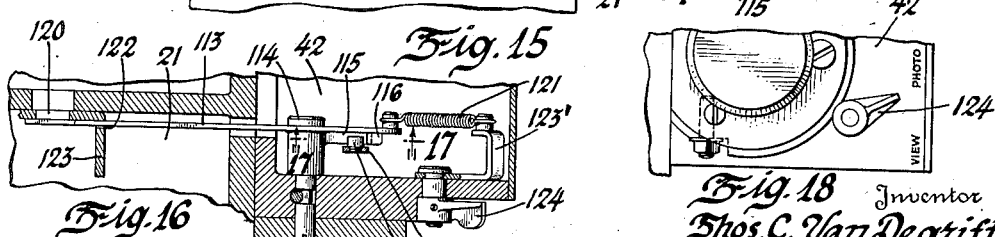
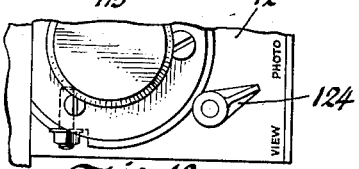
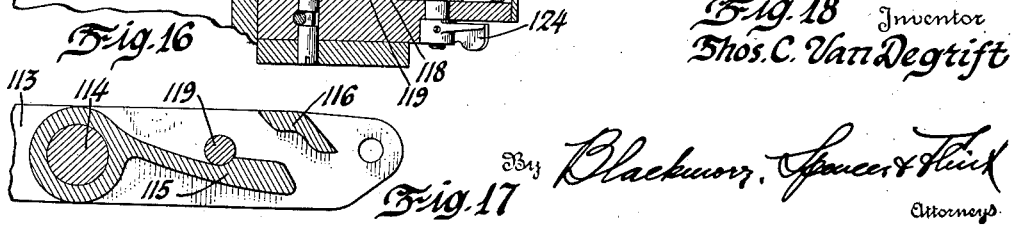

Nov. 17, 1936

2,060,963

UNITED STATES PATENT OFFICE 2,060,963

VIBRATION INDICATING DEVICE

Thomas C. Van Degrift, Detroit, Mich., assignor to General Motors Corporation, Detroit, Mich., a corporation of Delaware Application January 17, 1934, Serial No. 707,039

16 Claims. (Cl. 73—51)

My invention consists in an instrument for investigating the vibrations in machines, mechanisms, or devices when they are running in accordance with their ordinary mode of operation and, while the same is illustrated as being used to investigate vibration of an internal combustion engine such as is used to drive automobiles, it may without change be used to investigate vibration in or associated with various other devices when in operation in the manner in which they are designed to operate. The instrument wherein my invention consists comprises a feeler which is placed in engagement with the device the vibrations of which are to be studied; a mirror operated by the feeler; other mirrors associated with said first-named mirror and arranged to reflect light from a suitable source onto a rotating mirror which spreads the reflected beam over a translucent screen or photographic film; means for driving the rotating mirror from the device the vibration of which is being studied so that the speed thereof will have a definite and fixed relation to the speed at which said device operates if it is a self-driving device like an engine or motor, or is operated if it is driven from a source exterior thereto; and auxiliary devices cooperating with those here enumerated and as will hereinafter appear. The drawings accompanying and forming a part of this application illustrate the preferred embodiment of my invention, and the concluding claims point out the particular features thereof wherein my invention consists.

In the drawings:

Figure 1 is a plan view showing my device set up and arranged to investigate the vibration of an internal combustion engine, the showing of the engine being conventional.

Figure 2 is a view showing a detail of a support or leg of a triangular base, which supports the device from the floor and enables it to be moved about and placed properly relative to the engine.

Figure 3 is a view showing a section upon a vertical plane indicated by the line 3—3, Figure 1.

Figure 4 is a view upon a larger scale than Figure 1, and omitting the supporting elements shown therein, the view being upon a vertical plane indicated by the line 4—4, Figure 1.

Figure 5 is a view showing a section upon a horizontal plane indicated by the line 5—5, Figure 4, looking down.

Figure 6 is a sectional view upon a vertical longitudinally extending plane, as in Figure 4, but showing various of the parts in other positions, and the use of a photographic film in place of a translucent screen.

Figure 9 is a view showing a section upon a vertical longitudinally extending plane indicated by the line 9—9, Figure 7.

Figure 10 is a view looking from a vertical transverse plane indicated by the line 10—10, Figure 8, and showing certain trigger or releasing mechanism of my device.

Figure 11 is a fragmentary view showing a section upon a vertical transverse plane indicated by the line 11—11, Figure 9.

Figure 12 is a wiring diagram for the various electrical elements which enter into the make-up and operation of my device.

Figure 13 is a diagram showing an alternative source of current supply capable of taking the place of the left-hand supply end of Figure 12 when photographs are not to be taken.

Figure 14 is a view corresponding in a general way with Figure 8 (the tachometer however being omitted) but showing the use of a mechanically operated shutter in place of an electromagnet for effecting exposure of a photographic film made use of under certain circumstances.

Figure 15 is a view showing a section upon a vertical transverse plane indicated by the line 15—15, Figure 14. This view corresponds in a general way with Figure 7 except that this is looking forward from the plane 7—7, Figure 1, whereas Figure 15 is looking rearward from the plane 15—15, Figure 14, which plane, however is in about the same place as the plane 7—7, Figure 1.

Figure 16 is a fragmentary view looking down from the plane 16—16, Figure 15.

Figure 17 is a fragmentary view showing features of a cam for operating the shutter of this modified form of my device.

Figure 18 is a fragmentary view showing certain means for controlling the shutter of this second form of my device.

Figure 7:
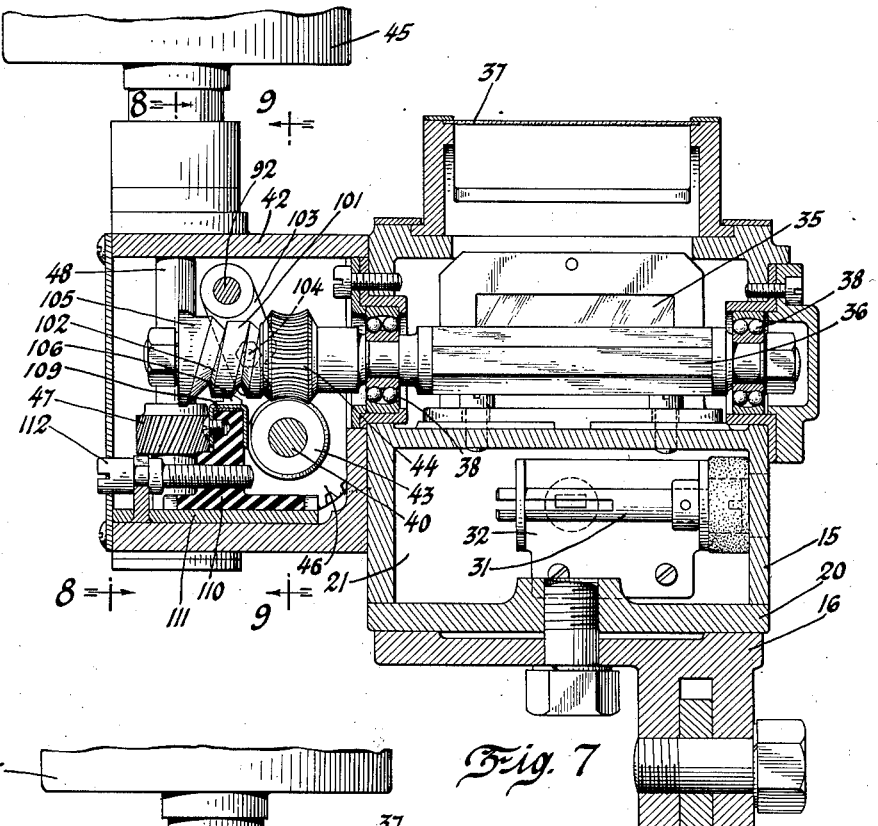
Figure 7 is a view showing a section upon a vertical transverse plane indicated by the line 7—7, Figure 1.

Referring now to the drawings, the numeral 15 designates a casing or housing for the principal operative parts and mechanisms of my device, the same being shown as supported from a base 16, Figure 7, so as to be angularly adjustable about vertical and horizontal axes; the housing, as appears in Figure 1, being supported from a massive tripod 17 at the end of a bar 18. This bar is slidable in an angularly adjustable clamping device carried by the tripod and designated as a whole by the numeral 19; so that and as shown in Figure 1 the device may be properly supported and arranged relative to an internal combustion engine 14 or other device the vibration characteristics of which, when the same is operating, are to be investigated. The base 16 is shown as secured to a removable cover plate 20 which closes a lamp compartment 21 within the housing.

Located within the housing 15 and supported from a head 22 which closes the open end thereof is an oscillating mirror 23, the same being carried by a support having an operating arm 24 and which support is pivotally supported between spaced pedestals 25 secured to the sides of an inwardly projecting part of the head 22, so that the mirror oscillates about a vertical axis. Oscillating movement is communicated to the mirror support and mirror through a feeler member in the form of a mirror operating rod 26 extending along a passage in a guide 27 therefor, which is carried by the head 22; and the inner end of this operating rod engages the arm 24 as appears in Figure 5. Springs 28 and 29 act to hold the arm 24 against the inner end of the rod 26 and the rod against an engine or other device the vibration of which is to be investigated, see Figure 1, from which it follows that vibration of the device being investigated will be communicated to the oscillating mirror.

The mirror 23 receives light from an incandescent bulb 30 in the lamp compartment 21, the beam passing through a slot in a rotatable member 31 which forms an adjustable slit diaphragm; said member being supported in arms carried by a plate 32 secured to a transverse inner wall of the housing 15. The beam after being reflected by the mirror 23 oscillates in a horizontal plane and is reflected to a second manually and magnetically operable angularly movable mirror 33 which, at the will of the user of the device, may be made to assume two different positions in one of which, see Figure 4, the vibrating beam is reflected therefrom to a third mirror 34, which is stationary.

The beam reflected from the mirror 34 and which as will be appreciated is vibrating in a horizontal plane passes through a lens 35 and falls upon a rotating mirror 36, and is reflected therefrom to a curved translucent screen 37, Figures 1 and 4, or to a photographic film 38, Figure 6. In either case the beam which would otherwise appear as a line of light upon the screen or film is spread by the rotating mirror and appears as an extended undulating curve extending lengthwise of the screen or film; and the form of which is determined by the character and magnitude of the vibrations of the engine or other device the vibration of which is being investigated. The lens 35 and rotating mirror 36 are located within a chamber 37' formed by internal partition walls of the housing 15, and which chamber lies above the lamp chamber 21 as appears in Figures 4 and 6. The screen is held in a suitable support or holder which is readily detachable from the housing 15, and replaceable by a roll holder of ordinary construction which contains the film; so that either the screen or the film may be used according as to whether the curves produced when the device is in operation are to be looked at or "viewed", or whether a photograph is to be taken of them. These parts, however, including features whereby they are made readily interchangeable with each other so that either may be used with a maximum of convenience, form no part of the invention to which this present application relates.

The shaft of the rotating mirror 36, see Figure 7, is supported in bearings 38 carried by the oppositely disposed vertical side walls of the housing 15, and the same is driven from the crank shaft of the engine or other device being investigated through a flexible shaft 39 which drives a horizontally arranged driving shaft 40, which extends longitudinally of the housing 15; and the ends of which shaft 40, see Figure 9, are supported in bearings 41 in opposite walls of an auxiliary housing 42 secured to one side of the housing 15, at the left-hand end thereof as appears in Figure 7. The driving shaft 40 drives the rotating mirror 36 through worm gearing 43, 44; and said shaft 40 also drives a tachometer 45 through gearing 46, 47 and a vertically arranged shaft 48 the ends of which are supported in bearings 49 in upper and lower walls of the auxiliary housing 42. A massive vibration dampener 500 loose upon an extension of the gear 46, see Figure 9, and frictionally held thereupon so that it may lag relative to the shaft 40, serves to damp torsional vibrations and secure smooth and uniform driving of the mirror 36 irrespective of torsional vibration of the long driving shaft 39.

The reference numeral 50 designates a vibrating mirror the purpose of which is to trace a sixty (60) cycle curve upon the translucent screen 37 or photographic film 38 along with the curve which indicates vibration of the engine, and which is due to the mirror 23 as hereinbefore explained; so that said sixty cycle curve may serve as a time scale in investigating vibrations indicated by the beam upon the screen. This mirror is carried by a resilient plate 51 held at one end between a pole 52 of a permanent magnet 53 and a coil cup 54 carried by said pole, see Figure 5, and the free end of which plate is connected to an armature 55 which lies between the cup 54 and another coil cup 56 carried by the other pole 57 of said magnet. Within the coil cups 54, 56 are coils 58, 59 which are connected in series so that their effects upon the armature 55 are added; and the ends of the coil system thus formed are connected to insulated terminals 60, 61 upon the inner side of the head 22. These terminals are indicated conventionally in the circuit diagram, Figure 12, and slip connections are provided between them and other insulated terminals secured within the housing 15 indicated conventionally at 62, 63, so that the head 22 carrying the mirrors 23 and 50 may be conveniently removed from the housing and reassembled therewith.

The connectors aforesaid, as indicated in Figure 12, connect the coils 58, 59 in a sixty cycle alternating current circuit, so that the armature 55 and mirror 50 will be vibrated at that rate per second. Light from the same lamp 30 falls upon this mirror 50, and is reflected thereby and by the mirrors 33 and 34 onto the rotating mirror 36, and therefrom to the screen 37 or film 38; whereupon the beam appears as a sixty cycle sine curve and serves as a time scale for investigating the curve due to vibration of the engine or other device and due to the mirror 23 as hereinbefore explained.

The mirror 33 is carried by an armature 66 which is supported between pivots 67 at the upper ends of pedestals 68, which rise from a cover plate 69 secured over an opening in the bottom wall of the housing 15; and this armature has two arms 70 which extend over the poles 71 of an electromagnet 72 supported by said cover plate. An arm 73 secured to the top of one pedestal carries an adjustable stop 74 with which one of the arms 70 engages, to thereby limit upward swinging movement of the armature 66, and an arm 75 secured to the upper end of the other pedestal serves as an abutment for a tension spring 76 the lower end of which is fastened to the other arm 70, and which acts to swing the armature upward. Downward movement of the armature is determined by adjustable stops 77 carried by the arms 70 and which engage the upper ends of the poles 71 of the electromagnet 72, and upward movement thereof is arrested by the adjustable stop 74 as will be understood.

Secured to the base plate 69 as by screws extending upward therethrough is a block 78 of insulating material having vertical grooves in which two metal contact strips 79 are secured, by screws 80; and the numeral 81 designates a second block of insulating material secured to a transverse ledge within the housing 15 by screws 82, and having vertical grooves within which contact springs 83 are secured. The strips 79 and contact springs 83 form separable connectors, as indicated in Figure 12, which permit the plate 69 and parts carried thereby to be removed and replaced without disturbing the wiring inside the housing whereby current is supplied to the electromagnet 72. The coils of this magnet are connected in series and the free ends of the winding are connected to screws 80 which hold the two strips 79, whereby the electromagnet is included in a direct current circuit of low voltage when the plate 69 is secured in place. The electric light 30 is connected in shunt with the magnet circuit which requires that the socket therefor be insulated, as shown in Figure 4, instead of grounded as is commonly the case.

The numeral 84 designates a plunger slidable and angularly movable in a tubular guide 85, and which plunger is held in an upward position by a spring 86 arranged in the upper part of the guide; and 87 is a pin carried by the plunger and operating in a slot 88 so that when the plunger is depressed and rotated slightly it will be retained in its lowermost position. The lower end of this plunger is provided with a yieldable foot 89 which engages an arm 70 of the armature 66 and holds it in against the poles 71 when the plunger is in its lowermost position, the poles of the electromagnet 72 thus forming stops to determine the lowermost swinging movement of the armature and of the mirror 33 carried thereby. When the armature is thus held in its lowermost position beams of light from the lamp 30 are reflected by the mirrors 23 and 50 to the mirror 33, and from it to the stationary mirror 34 and from it to the rotating mirror 36, and the two rays are spread by the rotating mirror and appear as curves upon the screen 37 or photograph film 38. When, however, the plunger 84 is rotated to release it from the holding action of the pin 87 and slot 88 the spring 86 moves the plunger upward, and the spring 76 swings the armature 66 upward until an arm 70 engages the stop 74, thus limiting upward movement of the armature. When the armature is in this position the two rays instead of falling upon the rotating mirror and being reflected by it onto the screen or film are swung upward, as appears in Figure 6, and appear as horizontal lines of light in a stationary observation mirror 90 which is shielded from external light by a hood 91. This is a feature of particular advantage when the curves due to the oscillating mirrors are to be photographed, as it enables the user to see that the source of light and the mirrors 23 and 50 are operating properly just before the film is exposed by swinging the two beams downward and onto the rotating mirror as will next appear. If, however, a photograph is not to be taken then the plunger 84 may be depressed and locked in that position, and the curves due to the two beams of light will appear upon the translucent screen 37 and will be seen as long as the device remains in operation. It is often desirable, however, to be able to see whether the oscillating mirrors are operating properly even though the curves are to be observed directly upon the screen 37; and the angularly movable mirror 33 and plunger 84 obviously provide means whereby this may be accomplished, as the operator can at any time cause the reflected beams to fall upon the observation mirror 90 instead of passing on to the rotating mirror 36.

Figure 8:
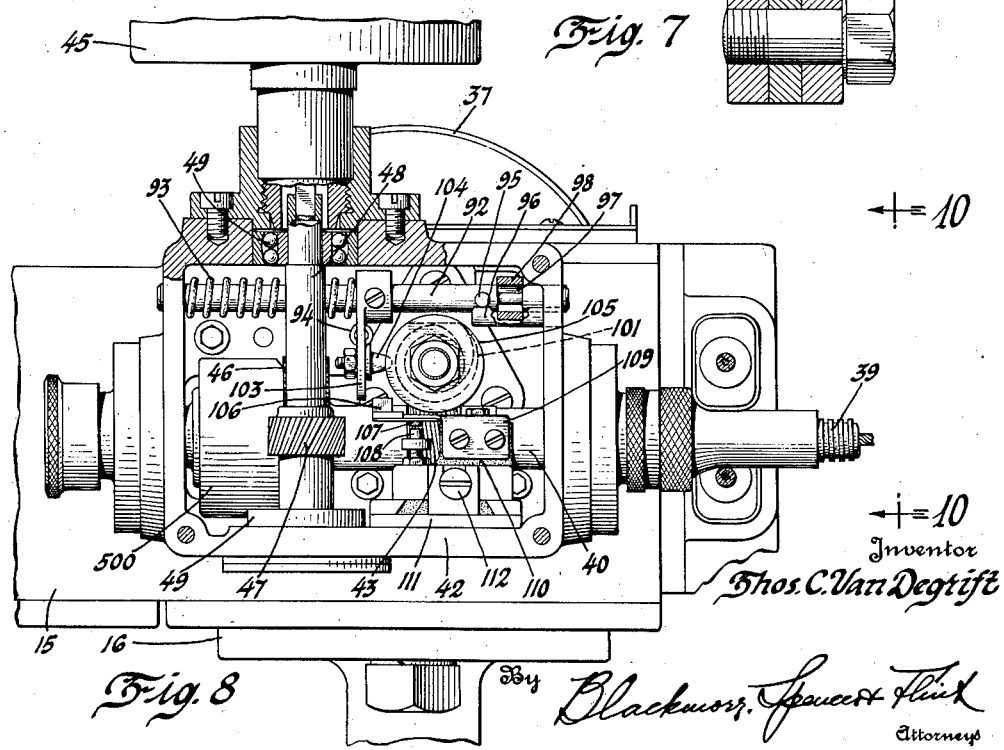
Figure 8 is a view showing a section upon a vertical longitudinally extending plane indicated by the line 8—8, Figure 7.

The numeral 92 designates an oscillatory circuit closing shaft supported in bearings in the end walls of the auxiliary housing 42 and slidable in said bearings and which shaft, see Figures 8 and 11, is moved longitudinally by a spring 93, and angularly by a spring 94, angular movement of said shaft being limited by a pin 95 which engages a stop 96 carried by the front wall of the housing 42. This shaft has a groove at 97 therein; and the same is held in the position shown in all the figures by a trigger member made up of a head 98 having a hole somewhat larger than the shaft and through which the same extends, a spring-pressed operating rod 99 to which said head is secured, and a knob 100, see Figure 10, for manually operating said trigger member to release the shaft 92; whereupon and when released the spring 93 will move said shaft to the right, Figure 8; to the left, Figure 9.

The shaft for the rotating mirror 36 and the gear 44 through which the mirror is driven, as hereinbefore explained, has also a cam member 101 cylindrical in form and having a deep coarse groove or thread 102 in its periphery; and the switch operating shaft 92 has an arm 103 with a conical pin 104 near its end and extending laterally therefrom, and the extremity of which pin enters the cam groove 102 when the trigger member is operated as aforesaid to release the shaft 92. Normally and when said shaft is locked in the position shown by engagement between the head 98 and the groove 97, the extremity of the conical pin 104 lies slightly outside of or beyond the periphery of the main cylindrical part of the cam member 101, but when said shaft is released said end enters the groove of the cam and the shaft is moved angularly as the pin runs along the groove, as will be understood. The left-hand end 105 of this cam member, as appears in Figures 7 and 8, is enlarged so that when the conical pin 104 reaches this enlarged part it will run out of the groove 102 and onto this enlarged part, and will be pushed radially and away from the cam far enough so that it will clear the main part thereof as the switch-operating shaft 92 is returned to the position in which it is shown by the spring 94. Just prior to the beginning of this return movement and as the large part 105 of the cam pushes the pin 104 beyond the periphery of the main part of the cam so as to clear it as aforesaid, the head 98 enters the groove 97 and holds said shaft against the action of the spring 93 and in the position shown until the knob 100 is again depressed.

When the knob 100 is pressed the switch operating shaft 92 is moved longitudinally by the spring 93 to cause the extremity of the pin 104 to enter the groove 102; and as the cam rotates the arm 103 is swung against the tension of the spring 94 until the point of the pin runs up upon the enlarged part 105 of said cam, thus compressing the spring 93 and moving the extremity of the pin out of the groove and beyond the periphery of the main part of the cam; whereupon the spring 94 returns the arm into the position shown, the position thereof when in its returned position being determined by the pin 95 and stop 96. During this forward movement, to the left Figure 7, the lower end of the arm 103 wipes across and depresses a spring switch member having an inclined block 106 at its free end, thus closing a circuit at the terminals 107, 108 in which the coils of the electromagnet 72 are included, see Figure 12. The armature 66 until this has been in its uppermost position, Figure 6, and the beams from the mirrors 23, 50 have been visible in the mirror 90; but when the circuit is closed at 107, 108 as aforesaid the electromagnet 72 is energized, its armature 66 is drawn downward, and the beams of light from the mirrors 23 and 50 are swung downward as shown in Figure 4 and fall upon the rotating mirror 36 and are spread along the screen 37 or film 38, whereupon they appear as elongated curves as hereinbefore explained. The closing of the circuit is of extremely short duration as is necessary in photographing the curves, but if the armature 66 is held in its lower position by the plunger 84 the curves will appear upon the screen 37 as long as the device remains in operation.

The inclined block 106 is at the free end of a spring arm 109 which is secured to a block 110 of insulating material and said block, which also carries the lower contact 108, is adjustable along a base or support 111 therefor by a screw 112. The rotating mirror 36 is shown as hexagonal, although the number of the faces thereof may be varied, but the speed at which it is driven (when the device is used to investigate the vibration of an internal combustion or other engine) is such that the beams of light reflected by the rotating mirror will be spread throughout the length of the screen 37 or film 38 each rotation of the crank shaft of the engine, or each stroke of a piston thereof. Then and by adjusting the position of the block 110 or the terminal 108 or both the timing of the closing of the circuit which energizes the electromagnet 72 may be varied so as to bring that part of the vibration indicating curve (due to the oscillating mirror 23) which corresponds with the beginning of the down stroke of a piston of the engine, or with some other definite phase of the cycle of operation thereof, at one end of the screen and of the photograph to be produced; so that one end of the photograph will correspond with and indicate the beginning of a piston stroke, or the starting from some definite and predetermined phase of the cycle of operation of the engine.

It will be appreciated that a source of direct current, as indicated in Figure 12, is necessary when the electromagnet 72 enters into the operation as aforesaid to swing the beams of light downward from their positions shown in Figure 6 and onto the rotating mirror 36; and that if a photograph is not to be taken the armature may be held in its lowermost position by the plunger 84 and the curves produced will appear upon the screen 37 for as long as the armature is held down. The device is thus adapted for both viewing the curves and for photographing them and is preferably made that way; and the electromagnet is out of use, as will be appreciated, when the device is used only for viewing the curves. If, however, the device as hereinbefore described is not to be used for photographing the curves then the electromagnet may be omitted and stops used for limiting the extreme positions of the mirror 33, for it will still be desirable to render the beams visible at the mirror 90. Under this last named condition of use, however, no source of direct current will be necessary, and alternate current both for the lamp 30 and the coils for the timing mirror 50 may be supplied by a single transformer as shown in Figure 13.

Figures 14 to 18 illustrate an embodiment of my invention wherein a mechanically operated shutter instead of an electromagnet is used to effect the exposure of the film, when a photograph of the curves due to the vibrating and rotating mirrors is to be taken. In these views Figure 14 corresponds, generally, with Figure 8, except that the tachometer and its immediate driving mechanism is omitted; and Figure 15 shows how a shutter within the lamp chamber 21 extends from the auxiliary housing 42 into said chamber, and is operated by mechanism within said housing having the same general features as the mechanism therein hereinbefore described. In these views the numeral 400 designates a shaft similar to the shaft 40, and which drives the mirror 36 through the same worm gearing 43, 44 hereinbefore described. The shaft which carries the mirror 36 is the same as the equivalent shaft shown in Figure 7, and this shaft carries a cam 1010 having substantially the same features of structure and operation as the cam 101 hereinbefore described.

In this second form there is an oscillating shutter 113 pivoted at 114 inside the auxiliary housing 42, and having laterally extending cam ledges 115, 116 as shown in Figures 16 and 17. The oscillating and longitudinally movable shaft 920 is substantially the same as the shaft 92 except that a single spring 117 moves the same longitudinally and imparts angular movement thereto; and this shaft has a shutter operating arm 118 with a laterally extending pin 119 at its end which engages the cams 115, 116 to operate the shutter and permit light from the lamp 30 to pass through the slot 120 and to the mirrors.

The shaft 920 carries an arm 1030 with a conical pin 1040 at its end, like the arm 103 and pin 104. When held by the trigger mechanism including a yoke 98 (being like the trigger mechanism hereinbefore described) the arm 118 lies to the left of its position shown in Figure 14, with the roller 119 to the left of the cams 115, 116. When, however, the trigger mechanism is released the spring 117 moves the shaft 920 to the right and the conical pin 1040 enters the groove in cam 1010, and the pin 119 is moved into a position over the cam 115. The arm 1030 is swung to the right, Figure 15, as the conical pin follows the cam groove, thus swinging the shutter 113 upward and admitting light through the slot 120 into the chamber wherein the mirrors are located; and as the pin 1040 reaches the end of its travel it runs up onto the enlarged outer end of the cam 1010 and the pin 119 is moved to the left, Figure 14, and beyond the cams 115, 116.

During this angular movement the spring 117 is stressed, torsionally, so that it may act to return the arms 1030 and 118 into the position in which they are shown in Figure 15 when the end of the pin 1040 has been freed from the groove in the cam 1010. However and as will be appreciated, the trigger mechanism catches the shaft 920 near the end of its movement to the left (caused by the high outer end of the cam 1010) so that while the spring 117 imparts angular movement to the shaft 920 as soon as the pin 1040 leaves the groove in the cam 1010 and the pin 119 moves beyond the cam 115, it does not move the said shaft longitudinally until the shaft is released from the holding action of the trigger mechanism. At the end of the return angular movement aforesaid the pin 119 lies to the left, Figure 14, of the cams 115, 116, wherein it is held by the trigger mechanism 98 until the shaft 920 is released, as will be appreciated.

A spring 121 acts in opposition to the action of the pin 119 upon the cam 115 and holds the shutter 113 in its lowermost position against the lower end of a slot 122 in a guide plate 123 secured to the front wall of the lamp chamber 21; and the outer end of this spring is attached to a swinging arm 123' operable by an arm 124 accessible to the operator. When the parts are in the positions shown the spring 121 holds the shutter against the lower end of the slot 122 and over the light slot 120, and an exposure of the photographic film may be accomplished as hereinbefore explained. When, however, the arm 123' is swung by the arm 124 into its lower position shown in dotted lines the outer end of the spring 121 is carried below its longitudinal axis, and it then acts to hold the shutter 113 against the upper end of the slot 122, with the light slot uncovered so as to permit rays from the lamp 30 to pass to the mirrors.

It will be appreciated that the electromagnet 72 as such has nothing to do with the exposure of the film when the mechanically operated shutter 113 is used. If the magnet is in fact present the arms 70 are held against the poles 71 by the plunger 84, and the poles 71 serve merely as stops and may obviously be replaced by other stops having no magnetic function. The plunger 84, however, is present in both forms, and with the positively operated shutter 113 held open said plunger when unlocked from the sleeve 85 permits the spring 76 to swing the arms 70 upward, thus making the rays reflected from the mirror 33 visible in the mirror 90; the shutter 113 being held open by the spring 121 as above explained. To prepare for the exposure of a photographic film when the mechanically operated shutter is used the arms 70 must be first swung down and held against the poles of the electromagnet 72, or against equivalent stops, by the plunger 84 as will be understood, the shutter 113 is moved to close the light slot 120, and a film holder as shown in Figure 6 is put in place; whereupon and upon releasing the trigger mechanism an exposure of the film will occur as hereinbefore explained.

The tripod 17 is preferably provided with castors 125 at its three corners, and vertically movable plungers 126 are provided adjacent each roller; so that after the device is properly placed these plungers may be depressed by cams 127, thus transferring the supporting of the device from the rollers to the plungers and securing a steadier supporting thereof. The rod 18 extends through holes in a hollow block 128 having a conical part fitting within a similarly shaped seat in a bracket 129 carried by the tripod 17, and within this block is a yoke 130 having a threaded stem 131 extending through a plain washer 132 and a cup-shaped washer 133 within which there is a spring 134; so that by loosening the nut 135 the parts of the support at 19 become loosened and the rod 18 slid lengthwise and moved angularly, and the end of the feeler rod 26 properly positioned against and relative to the engine 14 or other device the vibrations of which are to be investigated.

Having thus described and explained my invention I claim and desire to secure by Letters Patent:

1. In a vibration indicating device, an oscillatory mirror, and a feeler member for operating the same; a source of light; a rotating mirror having a plurality of plane faces; an angularly movable mirror; means for operating said angularly movable mirror in definitely timed relation with said rotating mirror; and a stationary observation mirror; the arrangement being such that a beam of light emanating from said source is reflected by said oscillatory mirror to said angularly movable mirror, and from said angularly movable mirror toward either said observation mirror or said rotating mirror.

2. In a vibration indicating device, an oscillatory mirror, and a feeler member for operating the same; a source of light arranged to illuminate said oscillatory mirror; a rotating mirror having a plurality of plane faces; a stationary observation mirror; an angularly movable mirror arranged to reflect a beam of light from said oscillatory mirror to said observation mirror; an electromagnet for operating said angularly movable mirror to swing the beam of light reflected thereby from said observation mirror, so that said beam may proceed toward said rotating mirror; a circuit in which said electromagnet is included; and a circuit controlling device operated in definitely timed relation with said rotating mirror for controlling said circuit.

3. In a vibration indicating device, an oscillatory mirror, and a feeler member for operating the same; a vibrating mirror, and magnetically operated means for operating said vibrating mirror; a source of light; a rotating mirror having a plurality of plane faces; an angularly movable mirror and means for operating the same; a stationary observation mirror; and means for supplying sixty cycle alternating current to the operating means aforesaid for said vibrating mirror; the arrangement being such that beams of light emanating from said source are reflected by said oscillatory and vibrating mirrors to said angularly movable mirror, and from said angularly movable mirror toward either said observation mirror or said rotating mirror.

4. In a vibration indicating device, an oscillatory mirror, and a feeler member for operating the same; a vibrating mirror, and magnetically operated means for operating said vibrating mirror; means for supplying sixty cycle alternating current to said vibrating mirror operating means; a source of light; a rotating mirror having a plurality of plane faces; a stationary mirror arranged to reflect beams of light to said rotating mirror; a stationary observation mirror; an angularly movable mirror; and means for moving said angularly movable mirror so as to reflect beams of light emanating from said source and reflected to said angularly movable mirror by said oscillatory and vibrating mirrors, to either said first mentioned stationary mirror or to said stationary observation mirror.

5. In a vibration indicating device, an oscillatory mirror, and a feeler member for operating the same; a source of light; a rotating mirror having a plurality of plane faces; an angularly movable mirror; means for operating said angularly movable mirror in definitely timed relation with said rotating mirror; and a stationary observation mirror; the arrangement being such that a beam of light emanating from said source is reflected by said oscillatory mirror to said angularly movable mirror, and from said angularly movable mirror toward either said observation mirror or said rotating mirror; and manually operable means for holding said angularly movable mirror in a position such that light is reflected therefrom toward said rotating mirror.

6. In a vibration indicating device, an oscillatory mirror, and a feeler member for operating the same; a source of light arranged to illuminate said oscillatory mirror; a rotating mirror having a plurality of plane faces; a stationary observation mirror; an angularly movable mirror arranged to reflect a beam of light from said oscillatory mirror to said observation mirror; an electromagnet for operating said angularly movable mirror to swing the beam of light reflected thereby from said observation mirror, so that said beam may proceed toward said rotating mirror; a circuit in which said electromagnet is included; a circuit controlling device operated in definitely timed relation with said rotating mirror for controlling said circuit; and manually controlled means whereby said angularly movable mirror may be placed and held in two definite positions in one of which the beam reflected by said angularly movable mirror falls upon said observation mirror, and in the other of which said beam proceeds toward said rotating mirror and falls thereupon.

7. In a vibration indicating device, an oscillatory mirror, and a feeler member for operating the same; a vibrating mirror, and magnetically operated means for operating said vibrating mirror; a source of light arranged to illuminate both said mirrors; a rotating mirror having a plurality of plane faces and which mirror is arranged to receive beams of light emanating from said source and reflected by the two mirrors aforesaid, and to reflect said beams onto a suitable screen; and means for supplying sixty cycle alternating current to the operating means aforesaid for said vibrating mirror.

8. In a vibration indicating device, an oscillatory mirror, and a feeler member for operating the same; a source of light arranged to illuminate said mirror; a rotating mirror having a plurality of plane faces and which mirror is arranged to receive a beam of light emanating from said source and reflected by said oscillatory mirror, and to reflect said beam onto a photographic film; means driven by and in unison with a running mechanism the vibration of which is to be investigated for operating said rotating mirror; and means operated by said rotating mirror operating means for causing a beam of light emanating from said source to fall upon said film.

9. In a vibration indicating device, an oscillatory mirror, and a feeler member for operating the same; a source of light arranged to illuminate said mirror; a rotating mirror having a plurality of plane faces and which mirror is arranged to receive a beam of light emanating from said source and reflected by said oscillatory mirror, and to reflect said beam onto a photographic film; means driven by and in unison with a running mechanism the vibration of which is to be investigated for operating said rotating mirror; means for interrupting the beam of light to prevent it from reaching said film; and manually operable trigger mechanism for bringing about operative engagement between said rotating mirror operating means and said interrupting means, to thereby operate the latter.

10. In a vibration indicating device, an oscillatory mirror, and a feeler member for operating the same; a source of light arranged to illuminate said mirror; a rotating mirror having a plurality of plane faces and which mirror is arranged to receive a beam of light emananting from said source and reflected by said oscillatory mirror, and to reflect said beam onto a photographic film; means driven by and in unison with a running mechanism the vibration of which is to be investigated for operating said rotating mirror; means normally disengaged from the rotating mirror operating means aforesaid and including a spring operated member adapted to engage with said rotating mirror operating means for interrupting the beam of light to prevent it from reaching said film; and manually operable trigger mechanism for restraining said spring operated member.

11. In a vibration indicating device, an oscillatory mirror, and a feeler member for operating the same; a source of light arranged to illuminate said mirror; a rotating mirror having a plurality of plane faces and which mirror is arranged to receive a beam of light emanating from said source and reflected by said oscillatory mirror, and to reflect said beam onto a photographic film; means for operating said rotating mirror; means operated by said rotating mirror operating means for interrupting the beam of light to prevent it from reaching said film, said means including an electromagnet; a circuit closer for controlling a circuit wherein said electromagnet is included; means operated by said rotating mirror operating means for operating said circuit closer; and manually operable trigger mechanism for controlling said circuit closer operating means.

12. In a vibration indicating device, an oscillatory mirror, and a feeler member for operating the same; a source of light arranged to illuminate said mirror; a rotating mirror having a plurality of plane faces and which mirror is arranged to receive a beam of light emanating from said source and reflected by said oscillatory mirror; and to reflect said beam onto a photographic film; means for operating said rotating mirror; means operated by said rotating mirror operating means for interrupting the beam of light to prevent it from reaching said film, said means including an electromagnet; a circuit closer for controlling a circuit wherein said electromagnet is included; a spring operated member operable by, but which member is normally out of engagement with said rotating mirror operating means; and manually operable trigger mechanism for restraining said spring operated member.

13. In a vibration indicating device, an oscillatory mirror, and a feeler member for operating the same; a source of light arranged to illuminate said mirror; a rotating mirror having a plurality of plane faces and which mirror is arranged to receive a beam of light emanating from said source and reflected by said oscillatory mirror, and to reflect said beam onto a photographic film; means for operating said rotating mirror; means for interrupting the beam of light to prevent it from reaching said film, said means including an electromagnet; a circuit closer for closing a normally open circuit wherein said electromagnet is included; and manually controlled means operable by said rotating mirror operating means for operating said circuit closer to close the circuit aforesaid.

14. In a vibration indicating device, an oscillatory mirror, and a feeler member for operating the same; a source of light; a rotating mirror having a plurality of plane faces; an operating shaft which carries said last-named mirror; a circuit closer operating cam on said shaft; means for driving said shaft; an electromagnet; a pivotally supported armature operated in one direction by said electromagnet, and in the other by a spring; a normally open circuit wherein said electromagnet is included; a circuit closer included in said circuit; a manually controllable member operated by the cam aforesaid for operating said circuit closer to close said circuit; an angularly movable mirror operated by said armature; and a stationary observation mirror; the arrangement being such that a beam of light emanating from said source is reflected by said oscillatory mirror to said angularly movable mirror, and from said angularly movable mirror toward either said observation mirror or said rotating mirror.

15. In a vibration indicating device, an oscillatory mirror, and a feeler member for operating the same; a source of light; a rotating mirror having a plurality of plane faces; an operating shaft which carries said last-named mirror; a circuit closer operating cam on said shaft; means for driving said shaft; an electromagnet; a pivotally supported armature operated in one direction by said electromagnet, and in the other by a spring; a normally open circuit wherein said electromagnet is included; a circuit closer included in said circuit; a spring operated circuit closing member operable by said cam and adapted to operate said circuit closer, but which member is normally out of engagement therewith; manually operable trigger mechanism for restraining said spring operated member; an angularly movable mirror operated by said armature; and a stationary observation mirror; the arrangement being such that a beam of light emanating from said source is reflected by said oscillatory mirror to said angularly movable mirror, and from said angularly movable mirror toward either said observation mirror or said rotating mirror.

16. In a vibration indicating device, an oscillatory mirror, and a feeler member for operating the same; a source of light arranged to illuminate said mirror; a rotating mirror having a plurality of plane faces and which mirror is arranged to receive a beam of light emanating from said source and reflected by said oscillatory mirror, and to reflect said beam onto a photographic film; means driven by and in unison with a running mechanism the vibration of which is to be investigated for operating said rotating mirror; and means operated by said rotating mirror operating means for interrupting the beam of light emanating from said source.

THOMAS C. VAN DEGRIFT.